(12) United States Patent
Hasegawa

(10) Patent No.: US 10,784,543 B2
(45) Date of Patent: Sep. 22, 2020

(54) CELL BLOCK AND CELL MODULE

(71) Applicant: Panasonic Intellectual Property Management Co., Ltd., Osaka (JP)

(72) Inventor: Takashi Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

(21) Appl. No.: 15/114,792

(22) PCT Filed: Feb. 18, 2015

(86) PCT No.: PCT/JP2015/000756
§ 371 (c)(1),
(2) Date: Jul. 27, 2016

(87) PCT Pub. No.: WO2015/155919
PCT Pub. Date: Oct. 15, 2015

(65) Prior Publication Data
US 2016/0359210 A1 Dec. 8, 2016

(30) Foreign Application Priority Data

Apr. 10, 2014 (JP) .................................. 2014-080843

(51) Int. Cl.
*H01M 10/6551* (2014.01)
*H01M 2/10* (2006.01)
(Continued)

(52) U.S. Cl.
CPC ..... *H01M 10/6551* (2015.04); *H01M 2/1077* (2013.01); *H01M 2/1094* (2013.01);
(Continued)

(58) Field of Classification Search
None
See application file for complete search history.

(56) References Cited

U.S. PATENT DOCUMENTS 6,340,877 B1 * 1/2002 Mita ..................... H01M 2/105
320/107
6,386,810 B1 * 5/2002 Onoe ..................... F16B 33/06
411/411
(Continued)

FOREIGN PATENT DOCUMENTS

CN 101828281 A 9/2010
CN 102013463 A 4/2011
(Continued)

OTHER PUBLICATIONS

International Search Report of PCT application No. PCT/JP2015/000756 dated May 19, 2015.
(Continued)

*Primary Examiner* — Ula C Ruddock
*Assistant Examiner* — Anna Korovina
(74) *Attorney, Agent, or Firm* — McDermott Will & Emery LLP

(57) ABSTRACT

A battery block includes a holding unit that holds a plurality of cells. The holding unit is made of a material having a heat conductivity. The holding unit includes openings that are open over the entire length of the side surfaces of the cells in the longitudinal direction. Each opening is formed so that, on the side surface of each cell, the area of a first region exposed to the outside through the opening is smaller than that of a second region other than the first region.

5 Claims, 4 Drawing Sheets

(51) Int. Cl.
*H01M 10/625* (2014.01)
*H01M 10/643* (2014.01)
*H01M 10/627* (2014.01)
*H01M 10/613* (2014.01)
*H01M 2/20* (2006.01)

(52) U.S. Cl.
CPC ......... *H01M 2/206* (2013.01); *H01M 10/613* (2015.04); *H01M 10/625* (2015.04); *H01M 10/627* (2015.04); *H01M 10/643* (2015.04)

(56) References Cited

U.S. PATENT DOCUMENTS

| | | | |
|---|---|---|---|
| 2002/0125860 A1 | 9/2002 | Schworm et al. | |
| 2010/0266886 A1 | 10/2010 | Joswig et al. | |
| 2010/0310919 A1* | 12/2010 | Villarreal | H01M 2/1077 429/120 |
| 2011/0267778 A1* | 11/2011 | Eckstein | B60L 11/1874 361/704 |
| 2012/0073848 A1* | 3/2012 | Shimizu | H01M 2/105 173/217 |
| 2012/0231309 A1 | 9/2012 | Itoi et al. | |
| 2013/0141850 A1* | 6/2013 | Honda | H01G 2/04 361/679.01 |
| 2013/0180684 A1 | 7/2013 | Gong et al. | |
| 2013/0183566 A1* | 7/2013 | Wayne et al. | H01M 10/504 429/120 |
| 2014/0087220 A1* | 3/2014 | Seiler-Thull | H01M 2/1077 429/83 |

FOREIGN PATENT DOCUMENTS

| | | |
|---|---|---|
| CN | 102549803 A | 7/2012 |
| JP | 2004-194478 | 7/2004 |
| JP | 2006-092935 | 4/2006 |
| JP | 2007-123147 | 5/2007 |
| JP | 2008-130330 | 6/2008 |
| JP | 2011-159474 | 8/2011 |
| JP | 2012-059373 | 3/2012 |

OTHER PUBLICATIONS

English Translation of Chinese Search Report dated Oct. 16, 2018 for the related Chinese Patent Application No. 201580012539.1.

* cited by examiner

CELL BLOCK AND CELL MODULE

TECHNICAL FIELD

The present invention relates to a battery block and a battery module including the battery block.

BACKGROUND ART

As a power source for driving a motor of an electric car or the like, or as a power source for household use or industrial use, the following battery module is employed. A battery block is formed by interconnecting cells such as lithium-ion cells in parallel, and a battery module is formed by interconnecting a plurality of battery blocks in series or in parallel. A battery module used for high power application is charged and discharged at a high current, and the temperature of the cells increases. In such a case, preferably, the heat generated when each cell is charged and discharged is radiated efficiently and the cell performance is kept in a satisfactory state in order to prevent the acceleration of cell degradation. For this purpose, for example, the following battery holder is known. In a resin-made battery holder that is divided into two in the longitudinal direction of the cells, a notch (cut-out) region is formed by cutting a part of a storage wall in a part of the longitudinal direction of the cells, and a region being in contact with the surface over the entire circumference of the cells is left. Thus, the heat conduction from the surfaces of the cells is kept and the reduction in heat radiation is suppressed (Patent Literature 1).

CITATION LIST

Patent Literature

PTL 1: Unexamined Japanese Patent Publication No. 2012-59373

SUMMARY OF THE INVENTION

The heat generated when each cell is charged and discharged can be cooled in the conventional method. However, the weight reduction and cost reduction are demanded of a battery module. More efficient heat radiation is demanded in order to take measures against the increase in heating value caused by the improvement in performance of the cells.

The present invention provides a battery block and battery module that reduce the weight and cost of the component as a heat radiation function, and can achieve more efficient heat radiation.

A battery block of the present invention includes a plurality of cells, and a holding unit that holds the plurality of cells and is made of a material having a heat conductivity. The holding unit includes openings that are open over the entire length of the side surfaces of the cells in the longitudinal direction. On the side surface of each cell, the area of a first region exposed to the outside through the opening is smaller than that of a second region other than the first region.

In the present invention, the weight and cost are reduced, and more efficient heat radiation can be achieved.

DESCRIPTION OF EMBODIMENT(S)

Hereinafter, an example of an exemplary embodiment of the present invention is specifically described with reference to the accompanying drawings. In referred drawings, the same element is denoted with the same reference mark, and duplicate description of the same element is omitted in principle.

Battery Block

Figure 1:
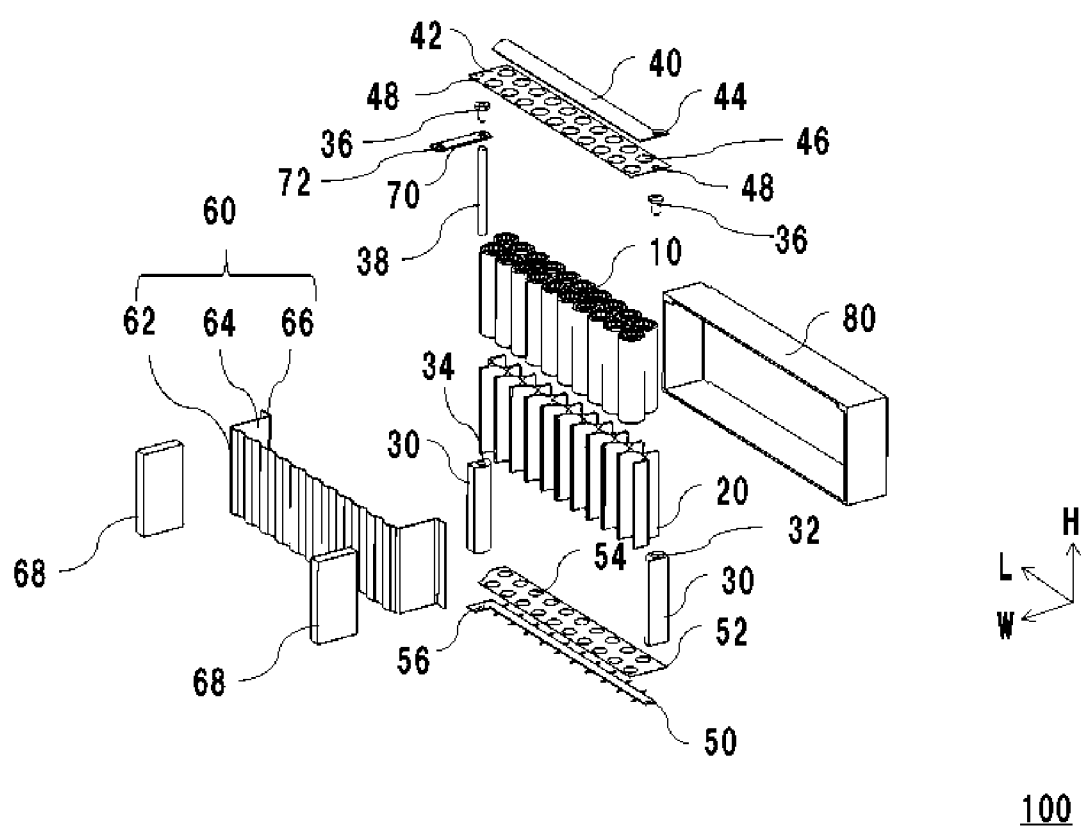
FIG. 1 is an exploded perspective view showing the configuration of a battery block in accordance with an exemplary embodiment of the present invention.

FIG. 1 is an exploded perspective view showing the configuration of battery block 100 in accordance with an exemplary embodiment of the present invention. Battery block 100 is formed by interconnecting a plurality of cells 10 in parallel so as to provide a predetermined capacity. In the present exemplary embodiment, one battery block 100 includes 20 cells. In battery block 100, 20 cells 10 are arranged in a staggered (zigzag) arrangement while the positive electrodes are aligned to one side and the negative electrodes are aligned to the other side, and are held by holding unit 20. Positive-side pillar member 30a and negative-side pillar member 30b (collectively called pillar members 30) are inserted into recesses 26 of holding unit 20, respectively. In battery block 100, positive-side collection plate 40 is disposed on the positive side of cells 10, and negative-side collection plate 50 is disposed on the negative side thereof. Positive-side collection plate 40 is fastened to positive-side pillar member 30a using fastening member 36, and negative-side collection plate 50 is fastened to negative-side pillar member 30b using fastening member 36. Side wall portion 60 contacts holding unit 20, and is fitted into frame body 80.

FIG. 1 shows the H direction, L direction, and W direction as three mutually-orthogonal axis directions. The H direction is the longitudinal direction of cells 10. The L direction and W direction mean arrangement directions of the two-dimensional arrangement of cells 10, and it is assumed that the L direction is along the longer side and the W direction is along the shorter side. The same is true for the drawings shown later.

Each cell 10 is a chargeable/dischargeable secondary cell. In the present exemplary embodiment, a lithium-ion cell is assumed as the secondary cell. Another cell such as a nickel-metal-hydride cell, alkaline cell, or sodium cell may be used. FIG. 1 shows a perspective view of 20 cells 10 in a state where they are stored and arranged in battery block 100. As shown here, 20 cells 10 are arranged in the staggered arrangement that minimizes the clearance between adjacent cells. Two cell columns are arranged in width direction W, and each cell column includes 10 cells along the L direction.

Each cell 10 has a cylindrical outer shape. Of both ends of the cylindrical shape, one end is used as a positive terminal, and the other end is used as a negative terminal One example of each cell 10 is a lithium-ion cell having a diameter of 18 mm, a height of 65 mm, an inter-terminal voltage of 3.6 V, and a capacity of 2.5 Ah. This is simply an example for description, another size and another characteristic value may be used. Cell 10 is not limited to a cylindrical cell, but may be a cell having another shape such as a square shape.

Figure 2:
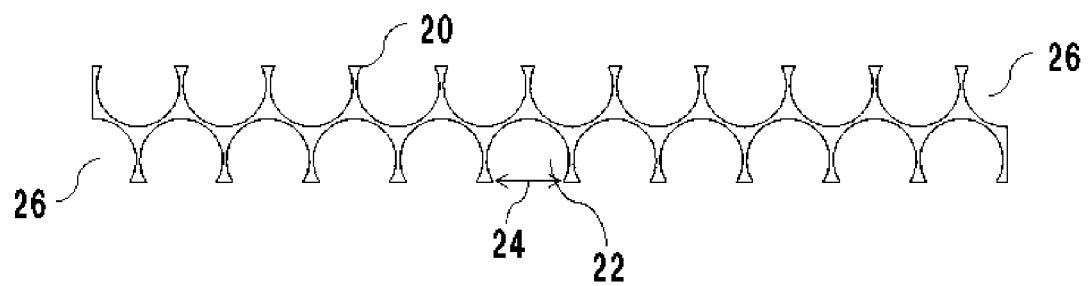
FIG. 2 is a plan view of a holding unit used in the exemplary embodiment of the present invention.

In holding unit 20, 20 cells 10 are arranged in the staggered arrangement and are held. FIG. 2 is a plan view of the holding unit. Holding unit 20 has the same length as that in the longitudinal direction of cells 10. Storage portion 22 for storing each cell has opening 24 that is open over the entire length of the side surface in the longitudinal direction of each cell 10. Storage portion 22 has a groove shape that has a substantially C shape when viewed from the H direction. Opening 24 is formed so that the area of the side surface (referred to also as first region) of cell 10 that is exposed to the outside through it is smaller than that of the side surface (referred to also as second region) of cell 10 that is covered with the inner wall of storage portion 22 except the opening In other words, the width of opening 24 is smaller than 50% of the entire circumference length of cell 10. Therefore, for example, even when battery block 100 is placed so that its upside or downside is pointed in the W direction, cells 10 held on the downside of holding unit 20 can be prevented from dropping out of storage portions 22, and cells 10 can be certainly held. Material corresponding to openings 24 can be saved in forming holding unit 20, so that the weight and cost of holding unit 20, eventually battery block 100, can be reduced.

Storage portions 22 are arranged in the staggered arrangement correspondingly to the arrangement of cells 10. In other words, two columns of storage portions 22 are arranged in width direction W so that substantially C shaped grooves are arranged alternately, and each storage column includes 10 storage portions 22 along the L direction. Therefore, on opposite ends of holding unit 20 along the H direction, margin spaces in which cell 10 is not placed can be created and recesses 26 are formed in the margin spaces at opposite ends along the W direction. Each recess 26 extends from one side to the other side of cells 10 along the H direction. Each recess 26 is recessed toward the arranged part of cells 10 in a semicircular shape when viewed from the H direction, and is along the outer shape of pillar member 30. Such holding unit 20 is made of aluminum, and is formed in a predetermined shape by extrusion molding or die casting.

The description is returned to FIG. 1. Pillar members 30 are members for integrating positive-side collection plate 40, positive-side insulating plate 42, negative-side collection plate 50, and negative-side insulating plate 52 with holding unit 20 for storing cells 10. As shown in FIG. 1, each pillar member 30 has a substantially semicircular shape as a whole. Pillar member 30 is inserted into recess 26 so that its semi-circumferential surface is pointed toward the arranged part of cells 10. Female screw 32 for fastening member 36 is disposed at an end of positive-side pillar member 30a fastened to positive-side collection plate 40. Hollow space 34 into which first coupling member 38 is inserted is formed in negative-side pillar member 30b fastened to negative-side collection plate 50. A engaging mechanism for engaging first coupling member 38 is disposed in hollow space 34 in negative-side pillar member 30b. Such pillar members 30 are formed in predetermined shapes using a material having an insulation property.

First coupling member 38 is a member for electrically coupling negative-side collection plate 50 to linking member 70. First coupling member 38 is inserted into space 34 in negative-side pillar member 30b, its one end is fastened to negative-side collection plate 50 via not-shown fastening member 36, and the other end is fastened to linking member 70 via fastening member 36. Female screws for fastening members 36 are disposed at both opposite ends of first coupling member 38. Such first coupling member 38 is formed in a predetermined shape using a material having an electric conductivity.

The positive electrodes of 20 cells 10 are aligned to one side and the negative electrodes thereof are aligned to the other side when the cells are stored in storage portions 22. In FIG. 1, the one side corresponds to the upside of the page along the H direction, and the other side corresponds to the downside of the page along the H direction.

Positive-side collection plate 40 is a connection member that is connected to the positive side of aligned and arranged cells 10 via a lead terminal or the like and electrically interconnects cells 10. Positive-side collection plate 40 includes through hole 44 for passing fastening member 36. Such positive-side collection plate 40 is formed in a predetermined shape using a material having an electric conductivity.

Positive-side insulating plate 42 is a plate material that is disposed between holding unit 20 and positive-side collection plate 40 and electrically insulates them from each other. Positive-side insulating plate 42 includes 20 positive-side openings 46 through which the positive electrodes of cells 10 are projected. Furthermore, positive-side insulating plate 42 includes through hole 48 for passing fastening member 36. Such positive-side insulating plate 42 is formed in a predetermined shape using a material having a predetermined heat resistance and insulation property.

Negative-side collection plate 50 is a connection member that is connected to the negative side of aligned and arranged cells 10 via a lead terminal or the like and electrically interconnects cells 10. Negative-side collection plate 50 includes through hole 56 for passing fastening member 36. Such negative-side collection plate 50 is formed in a predetermined shape using a material having an electric conductivity.

Negative-side insulating plate 52 is a plate material that is disposed between holding unit 20 and negative-side collection plate 50 and electrically insulates them from each other. Negative-side insulating plate 52 includes 20 negative-side openings 54 for exposing the negative electrodes of cells 10. Negative-side insulating plate 52 includes a notch for contacting negative-side pillar member 30b against negative-side collection plate 50. Such negative-side insulating plate 52 is formed in a predetermined shape using a material having a predetermined heat resistance and insulation property.

Side wall portion 60 is a member that contacts holding unit 20 and eliminates non-uniform heat distribution in holding unit 20. Side wall portion 60 includes plane portion 62, first folded portions 64, and second folded portions 66. Plane portion 62 has a substantially rectangular plate shape as a whole, and has a wave shape along the outline of cells 10 in the L direction. Each first folded portion 64 has a substantially rectangular plate shape as a whole, and is formed so as to extend in the direction orthogonal to plane portion 62, namely in the W direction. Each second folded portion 66 has a substantially rectangular plate shape as a whole, and is formed so as to project in the direction orthogonal to each first folded portion, namely in the L direction. Plane portion 62 contacts holding unit 20 so as to cover openings 24 of one cell column (the left cell column on the page in FIG. 1, and referred to also as the first cell column), of two cell columns arranged in the W direction. Thus, plane portion 62 is in surface contact with the outer wall surface of holding unit 20 in an uneven engagement state. As a result, the thermal coupling property to holding unit 20 is improved. Furthermore, the first cell column is stored in the space surrounded with holding unit 20 and plane portion 62, so that the first cell column can be stably held. In plane portion 62, similarly to the surface (the right surface on the page in FIG. 1, and referred to also as the inner wall surface) contacting the first cell column, the reverse surface in the W direction (the left surface on the page in FIG. 1, and referred to also as the outer wall surface) also has a wave shape along the outline of cells 10. Thus, when battery blocks 100 are arranged in the W direction, the outer wall surface of plane portion 62 of one battery block 100 is in surface contact with (in an uneven engagement state) the outer wall surface of holding unit 20 on the second cell column side of its adjacent battery block 100. In this case, the second cell column is stored in the space surrounded with holding unit 20 and plane portion 62 of adjacent battery block 100, so that the second cell column can be also stably held by plane portion 62. Such side wall portion 60 is formed in a predetermined shape using a material having a heat conductivity. Here, side wall portion 60 may be formed by integrating plane portion 62, first folded portions 64, and second folded portions 66. Plane portion 62, first folded portions 64, and second folded portions 66 may be fixed by welding or the like.

Second coupling members 68 are members for thermally inter-coupling side wall portions 60 of adjacent battery blocks 100 when battery blocks 100 are arranged in the W direction. Each second coupling member 68 is inserted into the space defined by each first folded portion and each second folded portion. Thus, when battery blocks 100 are arranged in the W direction, side wall portions 60 of adjacent battery blocks 100 are thermally coupled to each other via the second coupling members. Therefore, when variation in temperature occurs between side wall portions 60 of adjacent battery blocks 100, the temperature can be made uniform via the second coupling members. As a result, more efficient heat radiation can be achieved. Such second coupling members 68 are formed in predetermined shapes using a material having a heat conductivity.

Linking member 70 is a member for linking adjacent battery blocks 100 to each other when battery module 200 described later is formed of a plurality of battery blocks 100. Linking member 70 includes through hole 72 for passing fastening member 36. Such linking member 70 is formed in a predetermined shape using a material having an electric conductivity.

Frame body 80 is a member for fixing battery block 100 as a whole. Frame body 80 prevents an accident in which positive-side collection plate 40 and negative-side collection plate 50 are exposed to the outside, battery block 100 is short-circuited, or an electrical shock is received from battery block 100. Frame body 80 contacts first folded portions 64, second folded portions 66, and second coupling members 68, and stably holds second coupling members 68. Such frame body 80 is formed in a predetermined shape using a material having a predetermined heat resistance and insulation property.

Battery Module

Figure 3:
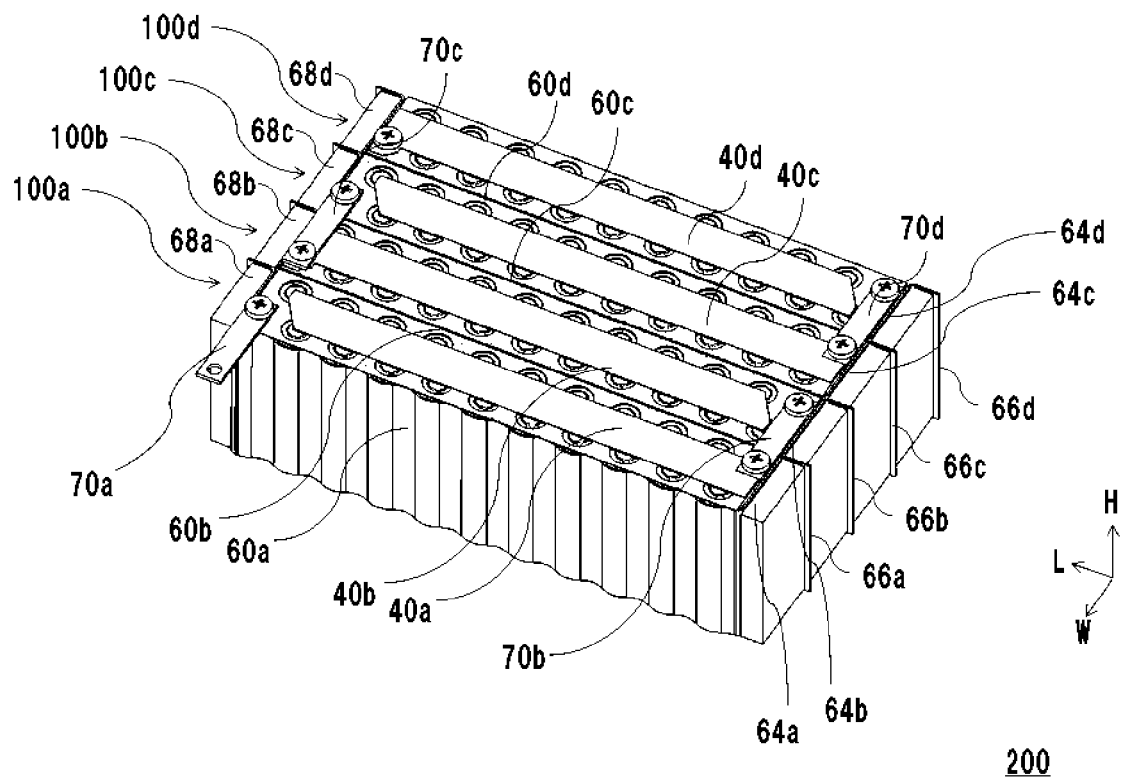
FIG. 3 is a perspective view showing the configuration of a battery module in accordance with the exemplary embodiment of the present invention.

Battery module 200 of the exemplary embodiment of the present invention is described. FIG. 3 is an exploded perspective view showing the configuration of battery module 200 in accordance with the exemplary embodiment of the present invention. For simplifying the description, frame bodies 80 of battery block 100a, battery block 100b, battery block 100c, and battery block 100d are omitted in FIG. 3.

As shown in FIG. 3, battery block 100a, battery block 100b, battery block 100c, and battery block 100d are adjacently arranged in the W direction. At this time, the second cell column of battery block 100a and the first cell column of battery block 100b are arranged so as to face each other via side wall portion 60b of battery block 100b. Similarly, the second cell column of battery block 100b and the first cell column of battery block 100c are arranged so as to face each other via side wall portion 60c of battery block 100c. The second cell column of battery block 100c and the first cell column of battery block 100d are arranged so as to face each other via side wall portion 60d of battery block 100d. Thus, the outer wall surface on the second cell column side of holding unit 20 of one of adjacent battery blocks 100 is thermally coupled to the outer wall surface on the first cell column side of holding unit 20 of the other via side wall portion 60 of the other battery block 100. In other words, adjacent battery blocks 100 are thermally coupled to each other via side wall portion 60. As a result, when variation in temperature occurs between adjacent battery blocks 100, heat conduction occurs between battery blocks 100 via side wall portion 60, hence the temperature can be made uniform and efficient heat radiation can be achieved.

As discussed above, each second coupling member 68a is inserted into the space defined by first folded portion 64a and second folded portion 66a of battery block 100a. Similarly, second coupling member 68b is inserted into the space defined by first folded portion 64b and second folded portion 66b of battery block 100b. Second coupling member 68c is inserted into the space defined by first folded portion 64c and second folded portion 66c of battery block 100c. Second coupling member 68d is inserted into the space defined by first folded portion 64d and second folded portion 66d of battery block 100d. Therefore, when variation in temperature occurs between side wall portions 60 of adjacent battery blocks 100, the temperature can be made uniform via the second coupling members. Holding units 20 of adjacent battery blocks 100 are thermally coupled to each other via side wall portion 60, and also via side wall portion 60 and second coupling members 68, so that more efficient heat radiation is allowed entirely in the battery module.

One end of linking member 70d of battery block 100d is connected to positive-side collection plate 40c of battery block 100c. Similarly, one end of linking member 70c of battery block 100c is connected to positive-side collection plate 40b of battery block 100b, and one end of linking member 70b of battery block 100b is connected to positive-side collection plate 40a of battery block 100a. While, the other end of linking member 70 of each battery block is connected to negative-side collection plate 50 via first coupling member 38 as discussed above. Therefore, of adjacent battery blocks 100, one end of positive-side collection plate 40 of one battery block is connected, via fastening member 36, to one end of first coupling member 38 coupled to negative-side collection plate 50 of the other battery block 100. In other words, battery block 100a, battery block 100b, battery block 100c, and battery block 100d are interconnected in series via linking members 70. As a result, the configuration where a positive terminal and negative terminal are disposed for each battery block 100 and the positive terminals and negative terminals of adjacent battery blocks 100 are interconnected via appropriate connection members is not required, and the cost and size of battery module 200 can be reduced. Battery block 100a, battery block 100b, battery block 100c, and battery block 100d are fixed physically via linking members 70. Therefore, a fixing member for fixing battery blocks 100 is not required, and the cost and weight of battery module 200 can be reduced.

In the exemplary embodiment of the present invention, holding unit 20 is made of a material having a heat conductivity, and includes openings 24 that are open over the entire length of the side surfaces of the cells in the H direction, namely in the longitudinal direction of the cells. On the side surface of each cell 10, the area of the first region that is exposed to the outside through opening 24 is smaller than that of the second region other than the first region. Therefore, cells 10 can be certainly held. The material corresponding to openings 24 can be saved, so that the weight and cost of battery block 100 can be reduced. Side wall portion 60 is made of a material having a heat conductivity. Side wall portion 60 includes plane portion 62, first folded portions 64 formed orthogonally to plane portion 62, and second folded portions 66 projecting outward so as to be orthogonal to first folded portions 64. Therefore, side wall portion 60 can stably contact holding unit 20. When variation in temperature occurs in holding unit 20, the temperature can be made uniform. Plane portion 62 has a wave shape along the outline of the side surfaces of the cells. Therefore, the thermal coupling property to holding unit 20 is improved. Recesses 26 into which pillar members 30 are inserted are at opposite ends of holding unit 20. Therefore, positive-side collection plate 40, positive-side insulating plate 42, negative-side collection plate 50, and negative-side insulating plate 52 are compactly integrated with holding unit 20. Negative-side pillar member 30b fastened to negative-side collection plate 50 has hollow space 34 into which first coupling member 38 is inserted. Therefore, when a battery module is formed of a plurality of battery blocks 100, a compact series-connection configuration can be achieved. Regarding the plurality of battery blocks 100 constituting battery module 200, second coupling members 68 are inserted into the spaces defined by first folded portions 64 and second folded portions 66 of adjacent battery blocks 100. One end of positive-side collection plate 40 of one battery block 100 is connected, via linking members 70, to one end of first coupling member 38 that is coupled to negative-side collection plate 50 of the other battery block 100. Therefore, the cost and size of battery module 200 can be reduced.

The present invention has been described on the basis of the exemplary embodiment. Persons skilled in the art understand that this exemplary embodiment is an example, various modified examples can be created by combining various components and various processes, and these modified examples are in the scope of the present invention.

Modified Example

The present exemplary embodiment has described the example where holding unit 20 is formed of one component. However, a holding unit may be formed of two components.

Figure 4:
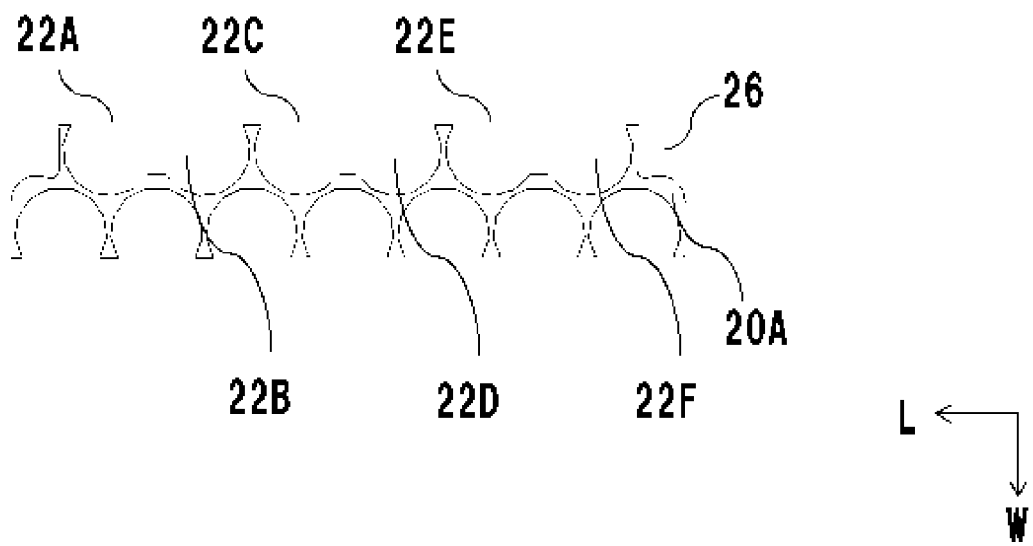
FIG. 4 is a plan view showing a first holding component as a component constituting a modified example of the holding unit in accordance with the exemplary embodiment of the present invention.

FIG. 4 is a plan view showing first holding component 20A as a component constituting a modified example of the holding unit in accordance with the exemplary embodiment of the present invention. As shown in FIG. 4, in the cell column on the upside of the page along the W direction, a partition wall between storage portion 22A and storage portion 22B, a partition wall between storage portion 22C and storage portion 22D, a partition wall between storage portion 22E and storage portion 22F are omitted. Thus, first holding component 20A is formed. In other words, a partition wall is formed in every other part between adjacent storage portions 22. Thus, the material corresponding to the omitted partition walls can be saved, and the weight and cost of battery block 100 can be further reduced.

Figure 5:
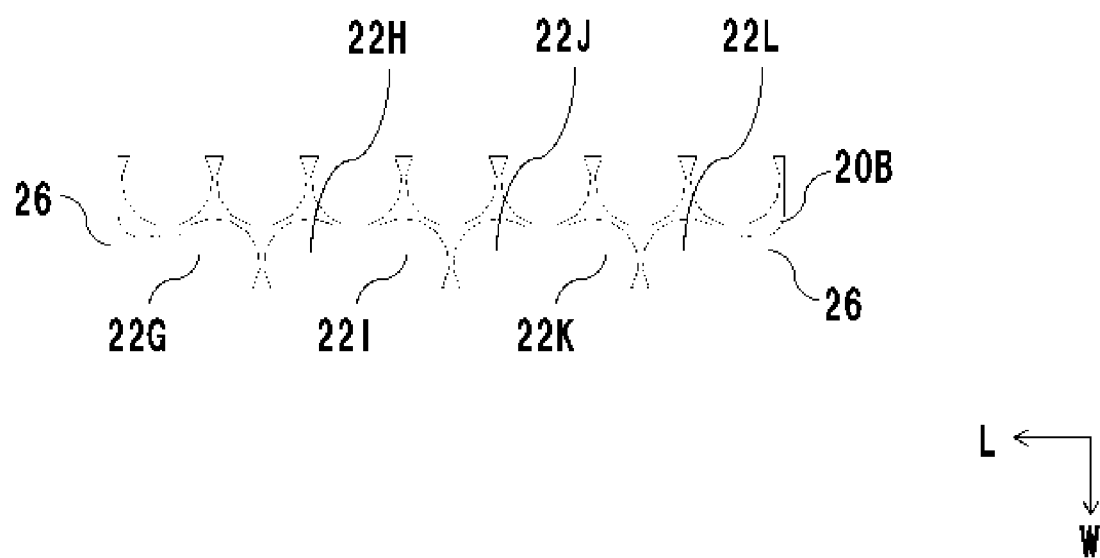
FIG. 5 is a plan view showing a second holding component as another component constituting the modified example of the holding unit in accordance with the exemplary embodiment of the present invention.

FIG. 5 is a plan view showing second holding component 20B as another component constituting the modified example of the holding unit in accordance with the exemplary embodiment of the present invention. As shown in FIG. 5, in the cell column on the downside of the page along the W direction, a partition wall between recess 26 and storage portion 22G, a partition wall between storage portion 22H and storage portion 22I, a partition wall between storage portion 22J and storage portion 22K, and a partition wall between storage portion 22L and recess 26 are omitted. Thus, second holding component 20B is formed. Also in second holding component 20B, similarly to first holding component 20A, a partition wall is formed in every other part between adjacent storage portions 22. In second holding component 20B, however, the partition walls are formed so that, when it is combined with first holding component 20A, the partition walls in second holding component 20B are located at the parts of the omitted partition walls in first holding component 20A. When holding unit 20 is formed of first holding component 20A and second holding component 20B, forming the partition walls in such a manner can compensate the holding force of parts having no partition wall.

Figure 6:
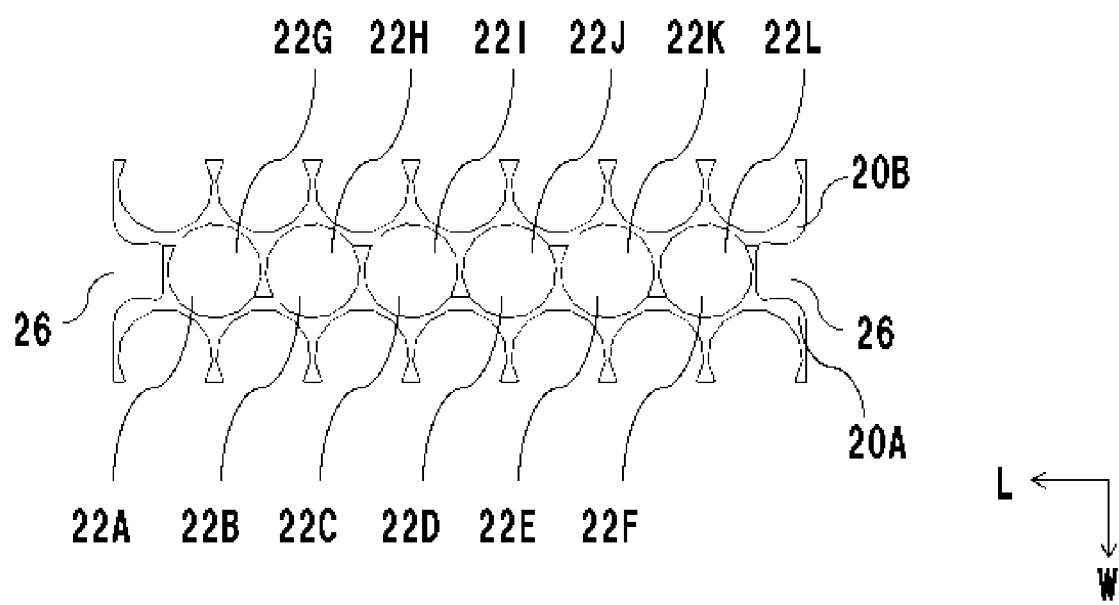
FIG. 6 is a plan view showing the configuration of the modified example of the holding unit in accordance with the exemplary embodiment of the present invention.

FIG. 6 is a plan view showing the configuration of holding unit 20 as the modified example of the holding unit in accordance with the exemplary embodiment of the present invention. In holding unit 20 shown in FIG. 6, first holding component 20A is disposed on the downside of the page along the W direction, and second holding component 20B is disposed on the upside. First holding component 20A is combined with second holding component 20B so that the cell columns of respective components that have the omitted partition walls face each other, thereby forming holding unit 20. In this case, a part having a partition wall in second holding component 20B is located at a part having no partition wall in first holding component 20A. A part having no partition wall in second holding component 20B is located at a part having a partition wall in first holding component 20A. Thus, a substantially circular space capable of storing cell 10 is formed of storage portion 22A and storage portion 22G. Similarly, substantially circular spaces capable of storing cells 10 are formed of storage portion 22B and storage portion 22H, storage portion 22C and storage portion 22I, storage portion 22D and storage portion 22J, storage portion 22E and storage portion 22K, and storage portion 22F and storage portion 22L, respectively. As a result, even when partition walls are omitted, the holding force for cells 10 is compensated. Therefore, the weight and cost of holding unit 20, eventually battery block 100, can be reduced while cells 10 are held stably.

The invention related to the present exemplary embodiment may be specified using the following items,

[Item 1]

A battery block includes a plurality of cells, and a holding unit that holds the plurality of cells and is made of a material having a heat conductivity. The holding unit includes openings that are open over the entire length of the side surfaces of the cells in the longitudinal direction. On the side surface of each cell, the area of a first region exposed to the outside through the opening is smaller than that of a second region other than the first region.

[Item 2]

The plurality of cells are arranged so as to form a plurality of cell columns The battery block according to item 1 further includes a holding component having a plurality of storage portions capable of storing the plurality of cell columns The openings are formed in the first storage portions disposed correspondingly to the first cell column. Regarding the second storage portions disposed correspondingly to the second cell column, a partition wall is formed in every other part between adjacent storage portions. The holding unit is formed by combining a plurality of holding components.

[Item 3]

The battery block according to item 1 further includes a side wall portion that is made of a material having a heat conductivity and contacts the holding unit. The side wall portion includes a plane portion covering the openings, a first folded portion formed so as to be orthogonal to the plane portion, and a second folded portion formed so as to be orthogonal to the first folded portion and project outward.

[Item 4]

In the battery block according to item 3, the plane portion has a wave shape along the outline of the side surfaces of the cells.

[Item 5]

The plurality of cells are arranged in a staggered arrangement while the positive electrodes are aligned to one side and the negative electrodes are aligned to the other side. The staggered arrangement minimizes the clearance between adjacent cells. The battery block according to item 4 further includes a positive-side collection plate that interconnects the positive electrodes of the plurality of cells in parallel and collects power, a negative-side collection plate that interconnects the negative electrodes of the plurality of cells in parallel and collects power, and two pillar members fastened to the positive-side collection plate and negative-side collection plate, respectively. The holding unit includes recesses having no cell on opposite end sides in the direction in which the columns having the plurality of cells arranged in the staggered arrangement are extended. The two pillar members are inserted into the recesses, respectively.

[Item 6]

The battery block according to item 5 further includes a first coupling member made of a material having an electric conductivity. Of the two pillar members, the pillar member fastened to the negative-side collection plate includes a hollow space into which the first coupling member can be inserted from the longitudinal direction of the cells.

[Item 7]

A battery module includes a plurality of the battery blocks according to item 6, a second coupling member made of a material having a heat conductivity, and a linking member made of a material having an electric conductivity. The plurality of battery blocks are arranged via side wall portions in the direction orthogonal to the direction in which the plurality of cell columns are extended. Regarding adjacent battery blocks, the second coupling member is inserted into a space formed of the first folded portion and the second folded portion in each of the battery blocks. One end of the positive-side collection plate of one battery block is connected, via the linking member, to one end of the first coupling member that is coupled to the negative-side collection plate of the other battery block.

INDUSTRIAL APPLICABILITY

A battery block and a battery module of the present invention are useful as a power source for driving a motor of an electric car or the like or a backup power source or the like.

REFERENCE MARKS IN THE DRAWINGS 10 cell
20, 20A holding unit
20A1 first holding component
20A2 second holding component
22, 22A, 22B, 22C, 22D, 22E, 22F, 22G, 22H, 22I, 22J, 22K, 22L storage portion
24 opening
26 recess
30 pillar member
30a positive-side pillar member
30b negative-side pillar member
32 female screw
34 space
36 fastening member
38 first coupling member
40, 40a, 40b, 40c, 40d positive-side collection plate
42 positive-side insulating plate
44 through hole
46 positive-side opening
48 through hole
50 negative-side collection plate
52 negative-side insulating plate
54 negative-side opening
56 through hole
60, 60a, 60b, 60c, 60d side wall portion
62 plane portion
64, 64a, 64b, 64c, 64d first folded portion
66, 66a, 66b, 66c, 66d second folded portion
68, 68a, 68b, 68c, 68d second coupling member
70, 70a, 70b, 70c, 70d linking member
72 through hole
80 frame body
100, 100a, 100b, 100c, 100d battery block
200 battery module

The invention claimed is:

1. A battery module comprising:
    a plurality of battery blocks at least one of the battery blocks in the plurality of battery blocks including:
        a plurality of cells; and
        a holding unit holding the plurality of cells and made of a material having a heat conductivity,
    wherein:
    the holding unit includes a plurality of storage portions, each of the plurality of storage portions storing at least one of the plurality of cells, an opening is formed in each of the plurality of storage portions, and the opening is formed over an entire length of a side surface of each of the plurality of cells in a longitudinal direction,
    the side surface of each of the plurality of cells includes an area of a first region exposed to an outside through the opening is smaller than an area of a second region other than the first region, and
    each opening includes a first end portion and a second end portion in a circumferential direction of an inner wall of a corresponding one of the plurality of storage portions, the inner wall includes a first edge portion which connects to the first end portion and a second edge portion which connects to the second end portion, wherein the inner wall continuously extends from the first edge portion to the second edge portion, wherein the plurality of cells are arranged in a staggered arrangement with positive electrodes aligned to one side and negative electrodes are aligned to another side, wherein the at least one of the battery blocks further comprises:
- a positive-side collection plate for interconnecting the positive electrodes of the plurality of cells in parallel and collecting current; and
- a negative-side collection plate for interconnecting the negative electrodes of the plurality of cells in parallel and collecting power; and two pillar members fastened to the positive-side collection plate and the negative-side collection plate, respectively, the holding unit includes recesses having no cell on opposite end sides in a direction in which a column of the plurality of cells arranged in the staggered arrangement is extended, and the two pillar members are accommodated into the recesses, respectively, the at least one of the battery blocks further comprising a first coupling member made of a material having an electric conductivity, and a linking member made of a material having an electric conductivity, wherein, one of the two pillar members, fastened to one of the positive-side collection plate and the negative-side collection plate, includes a hollow space into which the first coupling member is inserted from the longitudinal direction of the plurality of cells, wherein a first end of the first coupling member electrically connects to one of the positive-side collection plate and the negative-side collection plate, and a second end of the first coupling member electrically connects to the linking member, and wherein the linking member electrically connects to an adjacent block.

2. The battery module according to claim 1, wherein the plurality of cells are arranged so as to form a plurality of cell columns, the at least one of the battery blocks further comprises holding components, wherein the holding components include the plurality of storage portions for storing the plurality of cell columns, first storage portions, of the plurality of storage portions, are disposed correspondingly to a first cell column, of the plurality of cell columns, and the opening is formed in each of the first storage portions, and second storage portions, of the plurality of storage portions, are disposed correspondingly to a second cell column, of the plurality of cell columns, and a partition wall is formed in every other part between adjacent second storage portions, and the holding unit is formed by combining a plurality of the holding components.

3. The battery module according to claim 1, the at least one of the battery blocks further comprising a side wall portion made of a heat conductive material, the side wall portion contacting the holding unit, wherein the side wall portion includes:
- a plane portion covering the opening;
- a first folded portion formed so as to be orthogonal to the plane portion; and
- a second folded portion formed so as to be orthogonal to the first folded portion and project outward.

4. The battery module according to claim 3, wherein the plane portion is formed in a wave shape along an outline of the side surface of each of the plurality of cells.

5. The battery module according to claim 4, further comprising:
- a second coupling member made of a material having a heat conductivity; and
- a second linking member made of a material having an electric conductivity, wherein:

the plurality of battery blocks are arranged via the side wall portions in a direction orthogonal to a direction in which the plurality of cell columns are extended, the second coupling member is inserted into a space formed of the first folded portion and the second folded portion in each of the plurality of battery blocks.

\* \* \* \* \*